(12) United States Patent
Liu et al.

(10) Patent No.: US 8,583,613 B2
(45) Date of Patent: Nov. 12, 2013

(54) ON DEMAND DATA CONVERSION

(75) Inventors: Lujiang Liu, Highlands Ranch, CO (US); Vijayakumar K. Kendai, Aurora, CO (US); Anthony H. Cheng, Littleton, CO (US)

(73) Assignee: Oracle International Corporation, Redwood Shores, CA (US)

( * ) Notice: Subject to any disclaimer, the term of this patent is extended or adjusted under 35 U.S.C. 154(b) by 611 days.

(21) Appl. No.: 11/842,618

(22) Filed: Aug. 21, 2007

(65) Prior Publication Data

US 2009/0055445 A1    Feb. 26, 2009

(51) Int. Cl.
*G06F 17/30* (2006.01)
*G06F 15/16* (2006.01)

(52) U.S. Cl.
USPC .......................................... 707/695; 717/170

(58) Field of Classification Search
USPC ............ 707/999.203, 809, 803, 695; 717/170
See application file for complete search history.

(56) References Cited

U.S. PATENT DOCUMENTS

| | | | | |
|---|---|---|---|---|
| 6,031,533 A * | 2/2000 | Peddada et al. | ............... | 715/733 |
| 6,119,130 A * | 9/2000 | Nguyen et al. | ................ | 707/203 |
| 6,356,913 B1 * | 3/2002 | Chu et al. | ............................... | 1/1 |
| 6,473,765 B1 * | 10/2002 | Fink | .............................. | 707/702 |
| 6,574,631 B1 * | 6/2003 | Subramanian et al. | ................ | 1/1 |
| 7,155,462 B1 * | 12/2006 | Singh et al. | .................... | 707/203 |
| 7,222,147 B1 * | 5/2007 | Black et al. | .................... | 709/200 |
| 7,594,167 B1 * | 9/2009 | Fuchs et al. | .................... | 715/234 |
| 2002/0010867 A1 * | 1/2002 | Schaefer et al. | .............. | 713/201 |
| 2005/0102649 A1 * | 5/2005 | Hogg et al. | .................... | 717/100 |
| 2006/0161962 A1 * | 7/2006 | Hindle et al. | ................. | 725/115 |
| 2006/0190501 A1 * | 8/2006 | Massironi | ..................... | 707/203 |
| 2008/0162494 A1 * | 7/2008 | Long et al. | ....................... | 707/10 |

OTHER PUBLICATIONS

Salo-Merta, L; "Incremental Data Evolution—Complementary Approach to Schema Evolution of Organisation's Large Operational GIS Databases", 2002.*
Wei, Han-Chieh et al; "Study and Comparison of Schema Versioning and Database Conversion Techniques for Bi-temporal Databases", 1999.*

* cited by examiner

*Primary Examiner* — Usmaan Saeed
*Assistant Examiner* — Brittany N McCue
(74) *Attorney, Agent, or Firm* — Kilpatrick Townsend & Stockton LLP

(57) ABSTRACT

Novel tools for updating data structures in a database are presented. In an aspect, the tools are used to update a database's structures in response to the update of an application (such as an enterprise application) that uses the database. In another aspect, the tools may convert a data set to a new format when the updated application attempts to access the data set; in some cases, other data sets within the database might remain unconverted until their use. Advantageously, this allows for a database (and/or a table within a database) to be updated incrementally and/or on demand. This feature can mitigate the impact of the update on users, for example, by avoiding the need to take the database (and/or application) offline to perform a batch process to update the database.

15 Claims, 9 Drawing Sheets

ON DEMAND DATA CONVERSION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to databases and, more particularly, to tools for updating database data structures.

BACKGROUND

Databases store date for a variety of different purposes. In many cases, a database is used to store data that is generated and/or used by an application. Merely by way of example, many businesses (and other organizations) use software applications (and/or suites of such applications) to organize their business affairs, track business performance, and/or the like. Such applications (referred to herein as "enterprise applications") are often quite complex and/or data-intensive; often, an enterprise application is responsible for managing and/or analyzing data for virtually every aspect of an organization's business. Examples of enterprise applications include, without limitation, supply chain management ("SCM") applications that manage raw materials, work-in-process and/or finished products, coordinate with suppliers, and/or the like; customer relations management ("CRM") applications that are used to track, store and/or manage customer information; financial applications that track and/or analyze the financial performance of the organization; human resources applications that provide management of the human resources functions of the organization; and/or the like. In some cases, these enterprise applications are standalone applications; in other cases, a single enterprise application (and/or suite of applications) might provide some or all such functionality. One type of enterprise application is referred to enterprise resource planning ("ERP") software. Examples of enterprise applications include, without limitation, JD Edwards EnterpriseOne, PeopleSoft Enterprise applications, and the Oracle eBusiness Suite, all available from Oracle Corporation.

Because of their data-intensive nature, enterprise applications (as well as other types of applications) often use a database to store the data they generate, manage and/or use. In particular, many enterprise applications are configured to be used with a relational database management system ("RDBMS"), of which the Oracle 10g™ RDBMS is but one example. Typically, an application (such as an enterprise application) will store data in a plurality of tables, with relational links between various records and/or fields in the tables. In general, each application will have specific requirements for the data structures (e.g., tables, rows, fields, etc.) in a database used to store data for the application. More specifically, the database's data structures often are based on the features and/or requirements of the application.

This can present a problem when an application is updated. Merely by way of example, if an application is patched (e.g., to fix errors in the code, provide enhanced security, etc.), the patched application might impose different data structure requirements than the unpatched version. As another example, when an application is upgraded to a newer release level, any additional functionality offered by the new version of the application might require the storage of additional data, which the existing data structures in the database might be unable to accommodate. Hence, an application update often will require a corresponding change in the data structures used by the application.

Traditionally, this has been a computationally-expensive process, which can require a variety of operations from updating the structure of a single table to support additional fields in each record and/or for updating the format of various fields (and, possibly population of the new and/or modified data structures with data) to rearchitecting the table structure of the database. Accordingly, database updates traditionally have been performed as a batch process, generally requiring the database (and, by extension, any application using the database) to be made unavailable for a significant duration.

In many situations, this unavailability may have significant consequences. Hence, there is a need for tools that allow a database to be updated without rendering the database (and/or the application it supports) unavailable for extended periods of time.

BRIEF SUMMARY

Embodiments of the invention provide novel tools for updating data structures in a database. In an aspect, certain embodiments can be used to update a database's structures in response to the update of an application (and, in a particular aspect, an enterprise application) that uses the database. In another aspect, tools in accordance with some embodiments are configured to convert a data set (e.g., a record, set of records, etc.) to a new format when the updated application attempts to access (e.g., read, modify, store, etc.) the data set; in some cases, other data sets within the database will remain unconverted until their use. Advantageously, this allows for a database (and/or a table within a database) to be updated incrementally and/or on demand. This feature can mitigate the impact of the update on users, for example, by avoiding the need to take the database (and/or application) offline to perform a batch process to update the database.

There are a variety of ways in which a database's data structure can be updated in accordance with embodiments of the invention. Merely by way of example, in many cases, a database table will comprise a plurality of data sets, each of which might comprise a plurality of data elements (e.g., fields, etc.). In particular embodiments, a data set might be augmented with additional data elements (perhaps with default values) when converted to the new format. In an aspect, the new data elements might be stored in a new table. This can allow the existing table to continue to exist with the original data set, while a new table supports the additional requirements of the updated application. In other embodiments, the entire data set might be stored in the new table, and/or a header entry (which references the data set in the new table) might be stored in place of the data set in the existing table. In yet other embodiments, a new header table might be created; this header table might reference both the existing table and a new table, which might be configured to hold additional and/or modified data elements required by the updated application.

In another aspect, one set of embodiments allows an application to be updated and yet still operate in the original state. Merely by way of example, a value (such as a system constant, for instance) might be set to indicate that the application should continue to operate (and, of particular relevance to the invention) access the database as before the update. When it is desired for the application to operate in a new version (e.g., to use the updated version of the application and/or to access the data in a new format), the value can be changed. Advantageously, this can allow application and/or database updates to be staged to accommodate user schedules, availability requirements, and/or the like.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like). In a particular embodiment, the set of instructions might be incorporated within an enterprise application and/or might be provided as a separate computer program that can be used to configure the enterprise application.

Hence, one set of embodiments provides methods, including without limitation methods of updating a database. An exemplary method of updating a database comprises providing a database that includes a first table having stored therein data in a first format. The data might comprise a plurality of records, including a first record that comprises a plurality of fields. In some embodiments, the method further comprises determining that an application that uses the database has been updated. In an aspect, the update application may be configured to operable in either a pre-update version or an updated version. The pre-update version, for example, might require data to be stored in the database in a first format, while the updated version of the application might require data to be stored in the database in a second format.

In some cases, the method further comprises providing for a system constant to be assigned a first value, which might indicate that the application should continue to operate in the pre-update version. Based on the value of the system constant, a first data interface may be selected to provide access to the database; the first data interface, for example, might provide access to data in the first format. The method, then, might comprise storing one or more additional records from the application in the first table. These additional record(s) may be stored in the first format and/or received via the first data interface.

The method might also comprise providing for the system constant to be assigned a first value, e.g., to indicate that the application should operate in the updated version. Based on this value, a second data interface may be selected to provide access to the database; this second data interface might provide access to data in the second format. In some cases, the method receives a request, from the application (operating in the updated version) to access a record in the table. Based on this request, the record might be converted to the second format. Merely by way of example, converting the record might, in some cases, comprise augmenting the record with one or more additional fields. At least some of these additional fields might be stored in a second table (which might be created for that purpose). The application may then be provided with access to at least some of these additional fields via the second data interface (e.g., when the application is operating in the second version).

Another exemplary method of updating a database comprises providing a database for storing data for an application. The database might comprise a first table that is configured to store a plurality of data sets. The method might comprise determining that the application has been updated from a first version to a second version; the first version might require data to be stored in the database in a first format, while the second version might require data to be stored in a second version. (In some cases, determining that the application has been updated might comprise providing for the application to be updated.)

The method might further comprise receiving a request from the application, operating in the second version, to access a first data set in the first table. Based on this request, the first data set might be converted to the second format for access by the application. The method, then, might comprise providing the application with access to at least a portion of the first data set in the second format, when the application is operating in the second version.

Another set of embodiments provides systems for updating a database. An exemplary system comprises a database for storing data for an application. The database might comprise a first table, which might be configured to store a plurality of data sets. The system also might comprise one or more processors, which might be in communication with the database, as well as a computer readable storage medium that has encoded thereon a computer program comprising a set of instructions for programming the processor(s) to perform a set of operations. The computer program might comprise, for example, instructions to perform procedures in accordance with one or more methods of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF VARIOUS EMBODIMENTS

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may omit such features.

In a general sense, embodiments of the invention provide novel tools for updating data structures in a database. Such structures can include, without limitation, the table format of a database (e.g., the number and/or nature of tables in a database, the relationship between tables, etc.), the record format in a particular table and/or tables (e.g., which fields each record includes, how the records are related, etc.), the field format (e.g., the type of data in a particular field and/or fields, the values stored in one or more fields, the relationship between fields, the field labels, etc.), metadata about the tables, records and/or fields, and/or the like. (For ease of reference, the general term "data structure" is used herein to refer collectively to the overall organization of a database, including without limitation the tables, records, fields, metadata, and relationships therebetween, and updating the data structure of a database might comprise modification of any of these structures and/or other properties of the database.) Essentially, the tools of the invention can be used to update virtually any aspect of a database.

Figure 1A:
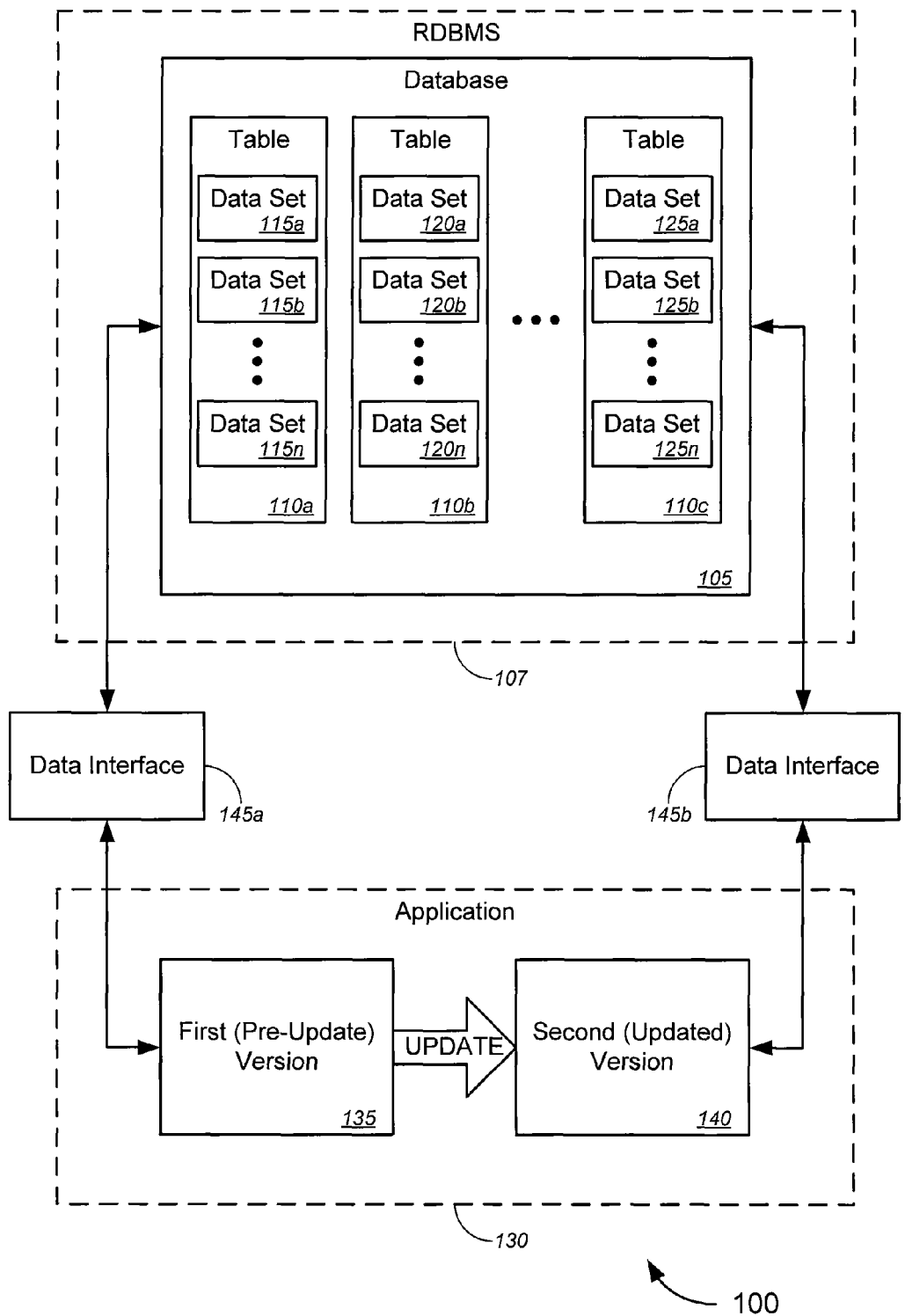
FIG. 1A is a block diagram a system employing a database and an application, in accordance with various embodiments of the invention.

Particular embodiments are configured to update a database's structures in response to the update of an application (and, in a particular aspect, an enterprise application) that uses the database. FIG. 1A illustrates functional components of a system 100 employing a database 105. In the illustrated embodiments, the database 105 is managed by an RDBMS, which provides access to the data in the database 105, ensures data integrity in the database 105 and performs other administrative functions for the database 105, including such things as backup, replication, and the like. In accordance with embodiments of the invention, the RDBMS 107 may also perform procedures related to the updating of the data structure of a database, as described in further detail below. The database 105 comprises one or more tables 110. Each table comprises a plurality of data sets. For example, one table 110a comprises a plurality of data sets 115, while another table might comprise a plurality of data sets 120, and a third table 110c might comprise a plurality of data sets 125. In an aspect, the database might be a relational database, in which a data set in a first table is related to one or more data sets in a second table through relational links.

Figure 1B:
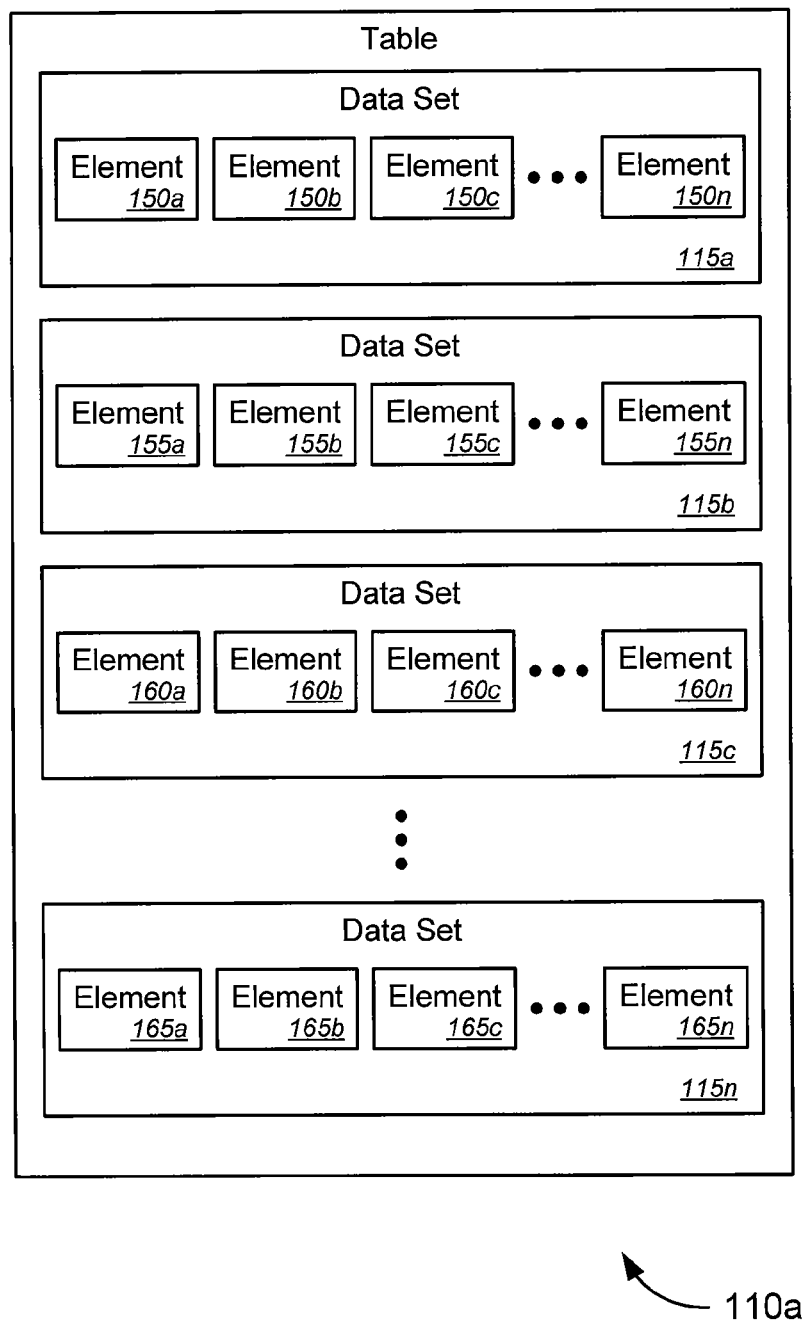
FIG. 1B is a block diagram illustrating a data structure of a database, in accordance with various embodiments of the invention.

As used herein, the term "data set" means any set of related data that can be stored in one or more database tables. A data set may (but need not necessarily) comprise one or more records in a database. As illustrated in FIG. 1B, a particular data set 115a, 115b, 115c typically will include one or more data elements (referenced in FIG. 1B by numerals 150, 155 and 160, respectively). Data elements might include, merely by way of example, fields in a database record. In some aspects, a table might have a set of field labels, and each data set (e.g., record) in the table might comprise a set of data elements associated with the field labels; each data element might comprise a value that is associated with one of the field labels.

Returning to FIG. 1A, the system 100 further comprises an application 130 in communication with the database 105. The application may be configured to access one or more data sets (e.g., 115) in one or more tables (e.g., 10a) in the database 105. Such access might comprise reading, writing (e.g., storing), modifying, etc., the data set 115 (and/or one or more data elements 150 thereof). In many cases, the database 105 (and/or an RDBMS that manages the database might provide standardized and/or proprietary access tools (such as a structured query language ("SQL") interface, an application program interface ("API"), a web service interface, etc. to provide the application 130 with access to the data set(s). Hence, while this disclosure describes the application 130 as "accessing" a data set, in many embodiments, the application more specifically might be thought of as requesting access to a data set, and the database and/or RDBMS will perform the necessary operations to provide, write, update, etc. the data set (and/or data elements thereof).

In accordance with a set of embodiments, the application 130 is updated from a first version 135 to a second version 140. Updating the application 130 might take a variety of forms, including without limitation applying patches, upgrading to a new release level, etc. (As used herein, a "version" of an application refers to any instance of an application that requires a particular data structure in a database. Hence, a first version of an application might require data in a first format, while a second version might require data in a second format, as described in further detail below. By contrast, the term "release level" refers to a specific release of a particular application, such as version 1.0, version 1.1, version 2.0, etc. Hence, while a first version of an application might have a different release level than a second version, that need not necessarily be the case. For example, if an application is patched, it might retain the same release level but require a different database data structure format, with the result that the patched application is of a different version, as that term is used herein, than the unpatched version, even though the release numbers might remain the same.)

A number of procedures are possible for updating an application, and any of them may be used in accordance with embodiments of the invention. Merely by way of example, in some cases a patch and/or hotfix for an application may be downloaded from a web site and run against the application. In other cases, a new release level of the application might be installed as an upgrade and/or reinstalled over the prior release level of the application. Other procedures are possible as well.

In a set of embodiments, the second (new) version 140 of the application 130 imposes different constraints and/or requirements on the data structure of the database 105 than the first (old) version 135. Merely by way of example, in some cases, added functionality introduced by the new version 140 might require additional data elements in each record in a particular table. As another example, the new version 140 might require certain data elements to be in a different format (i.e., have a different variable type, etc.). Additionally, the new version 140 might require the establishment of relationships (and/or disestablishment of existing relationships) between various tables, records and/or data elements in the database 105, and/or even the creation, modification and/or deletion of tables in the database 105.

In some embodiments, there are a plurality of data interfaces 145 between the application and the database 105. (These interfaces, in an aspect, are provided by the RDBMS 107, the application 130 and/or both. In another aspect, the interfaces 145 might be provided by another software component, such as middleware, etc.). In one set of embodiments, a first data interface 145a might be used to provide the first version 135 of the application 130 with access to the data in the database 105, while a second interface 145b might be used to provide the second version 140 with access to the data in the database 105. Merely by way of example, one of the data interfaces (e.g., 145a) might be configured to provide access to the data in the first format, while another data interface (e.g. 145b) might be configured to provide access to the data in the second format—e.g., the second interface might be configured to save data in the second format using additional tables (as described in further detail below), etc.

In one set of embodiments, the appropriate interface 145 is selected based on the value of the system constant. Hence, in the illustrated embodiment, if the system constant indicates that the first version 135 of the application 130 is enabled, a first data interface 145a might be selected to provide the application 130 with access to the data in the database 105. Conversely, if the system constant indicates that the second version 140 of the application 130 is enabled, a second data interface 145b might be selected to provide the application 130 with access to the data.

If the new version 140 of the application 120 is idempotent (i.e., can access the database 130 without modifying the data and/or data structure thereof), the new version 140 might be able to access the data in the database without requiring the database to be updated (for example, the database 105 and/or application 130 might be configured to supply default values for data elements required by the new version 140 but not present in the existing data structure of the database 105). However, if the new version 140 is non-idempotent, it is likely that the application 130 and/or database 105 will be broken (for instance, data integrity might be lost and/or the application might return an error) if the new version 140 of the application 130 attempts to access data that has been stored according to the requirements of the old version 135.

Accordingly, some embodiments of the invention provide for on-demand data conversion. Merely by way of example, the first time the application 130 (operating in the new version 140) requests access to a particular data set 115a, that data set 115a is converted for use by the new version 140 of the application 130. In an aspect of some embodiments, the conversion can be thought of as extending the original data 115a set to support the new requirements of the new version 140 of the application 130. Merely by way of example, the conversion of the data set 115a might include augmenting the data set 115a with one or more new data elements.

Figure 2A:
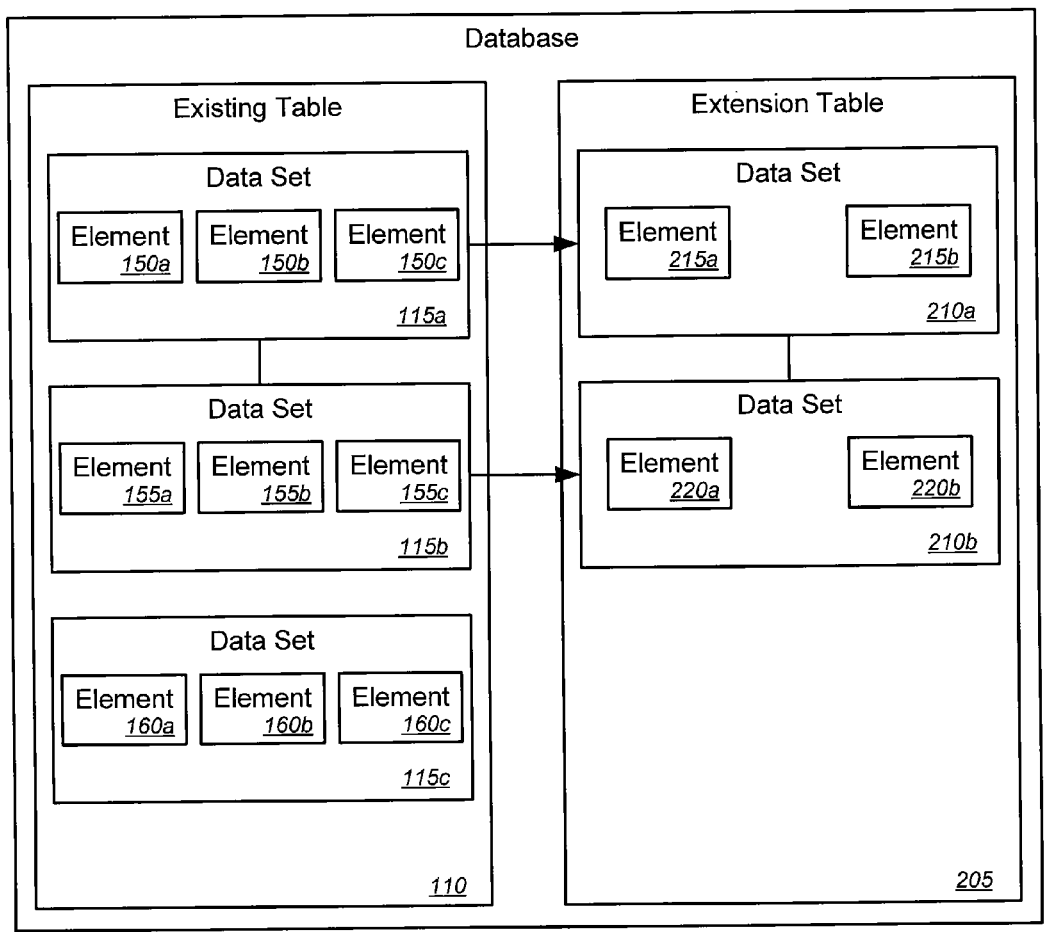
FIGS. 2A-2C illustrate databases with data structures that have been updated, in accordance with various embodiments of the invention.
Figure 2B:
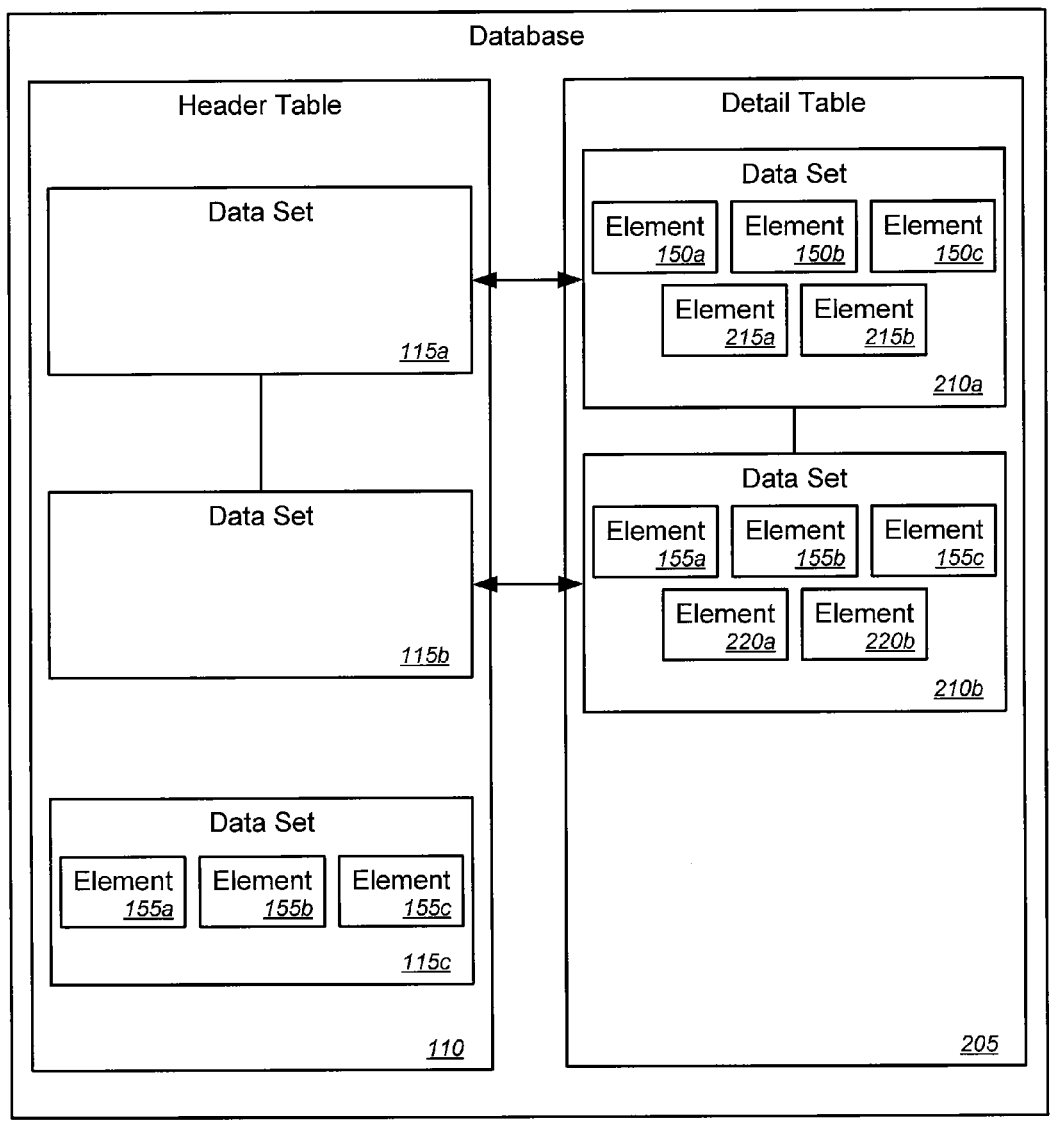
Figure 2C:
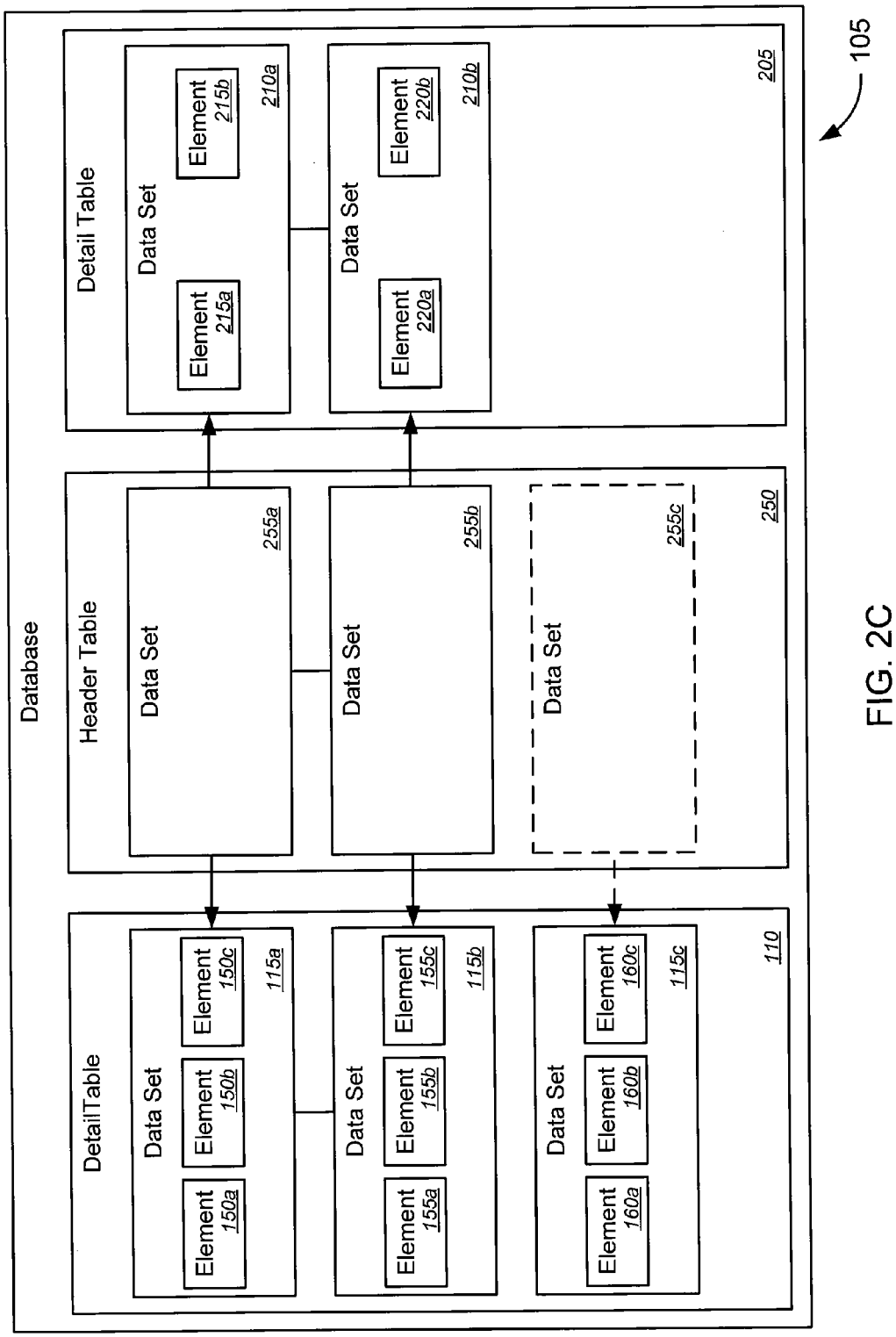

There are a variety of ways this can be accomplished, and FIGS. 2A-2C depict a few examples of data structures of a database 105 that has been updated to support a new version of an application 130. It should be appreciated that the data structure of the updated database 105 often will depend on the additional requirements imposed by the new version 140 of the application, the existing data structure of the database 105, and other factors. Accordingly, the examples shown in FIGS. 2A-2C are provided for illustrative purposes only and should not be considered limiting of the various ways in which a database 105 might be updated. In some cases, a RDBMS managing the database 105 might perform these updates. In other cases, the application 130 itself might perform the updates and/or the RDBMS and the application 130 might operated in conjunction to perform the updates.

Merely by way of example FIG. 2A depicts a data structure for the database 105 that accommodates the requirements of a new version 140 of an application 130 while retaining the existing structure of existing tables. In this example, the application 130 requires two additional elements to be added to each existing data 115 set that is stored in a table 110. The conversion process thus comprises creating a new table 205, which is an extension table of the existing table 110. (This new table 205 can be created upon first access by the new version 140 of the application 130 and/or prior to that event.) When the application 130 (operating in the new version 140) requests access to a particular data set 115a, a new data set 210a is created in the new table 205, and the data set 115a has been augmented with new data elements (specifically, the new data elements 215 are added to the new data set 210, which is referenced by the existing data set 115a) to support the requirements of the new version 140 of the application 130. In some cases, these new data elements 215 may have default values provided by the application 130 and/or RDBMS.

In some cases, the existing table 110 might reference the extension table 205 and/or the existing data set 115a might be updated to reference the new data set 210a. (In a sense, the new data set 210a can be considered an extension of the existing data set 115a.) In other aspects, however, the existing table 110 (and/or the data sets 115 therein) might remain unaffected, such that data integrity of the existing table remains unaffected. (This feature also facilitates rolling back the updates to the application 130 if necessary.)

In some cases, the data set 115a might be a key data set, on which one or more other data sets (e.g., 115b) depend (e.g., via relational links, etc.). In such cases, these other data set(s) 115b might be converted as well. Merely by way of example, in the embodiment illustrated by FIG. 2A, an additional data set 210b has been created with data elements 220 (which also might have default values provided).

In this example, the application 130 (operating in the new version 140) has not attempted to access a particular data set 115c. Accordingly, the data set 115c remains unchanged, and no extension of that data set has been created in the extension table 205. When access to data is needed, the application 130 (operating in the new version 140) can request access to the data set 115a in the existing table 110, and the RDBMS will supply appropriate data from the data set 210a in the new table 205, based on the reference in the existing table 110.

FIGS. 2B and 2C depict alternative arrangements of an updated data structure of the database 105. (The examples illustrated by FIGS. 2B and 2C assume a similar scenario to FIG. 2A, i.e., that an application 130 operating in an updated version 140 has requested access to a data set 115a, which is a key data set on which another data set 115b depends, while the new version 140 of the application has not attempted to access a third data set 115c.) In FIG. 2B, the existing table 110 has been converted to a header table for those data sets 115a, 115b that require conversion. Hence, the existing data sets 115a, 115b have been replaced with header records, which reference new data sets 210a, 210b, respectively, in a new table 205, which has been configured as a detail table for the existing table 110. In this case, the data elements 150 and 155 have been removed from the existing table 110 and stored in the respective data sets 210a, 210b in the new table 210b. The unaccessed data set 115c remains unchanged. In this example, the application 130 operating in the new version 140 can request access to the data set 115a in the existing table 110, and the RDBMS will provide the data from the appropriate data set 210a in the new table 205, based on the reference in the existing table 110.

The arrangement depicted by FIG. 2C is similar to the arrangement depicted by FIG. 2A, except that two new tables 205, 250 have been added to the database 105. In this case, the existing table 110 and one new table 205 are configured as detail tables, and another new table 250 is created as a header table with data sets (e.g., 255a) that reference both a data set (e.g., 115a) in the existing table 110 and a data set (e.g., 210a) in the new table. The existing data sets 115a, 115b have been augmented with new data elements 215, 220, respectively, which reside in data sets 210 in the new detail table 205 (similar to the arrangement of FIG. 1A). In this example, the new version of the application might simply request access to the appropriate data set, 255a in the header table 250, and the RDBMS provides the data based on the references in the data set 255a. If the request returned unsuccessful, it would access table 110 and perform data conversion, as described herein.

For a variety of reasons, an administrator might desire to update the application without activating any changes (e.g., added functionality, bug fixes, etc.) provided by the update. Merely by way of example, as noted above, in many cases, the updated application (i.e., the second version 140 of the application 130) might have different data structure requirements of the database 105 application prior to the update (i.e., the first version 135 of the application 130), and the administrator might want to stage the imposition of these new requirements in a particular fashion. As another example, there might be a need for testing of the application, etc. Accordingly, certain embodiments of the invention provide a value (which might be a system constant) to be used as an indicator of whether the application should operate 130 in the first version (i.e., in the un-updated state) or in the second version 140 (i.e., in the updated state). As described in further detail below, the use of this system constant (or other value) can allow the administrator to control when the application.

The examples depicted by FIGS. 2A-2C represent a few examples of the ways in which a data structure of a database can be updated to accommodate a new version 140 of an application 130. While the examples illustrate the behavior of an application and/or RDBMS with respect to three types of data sets (i.e., a data set 115 to which access has been requested by a new version 140 of an application 130, a data set 115b that is related to that data set 115b and an unrelated data set 115c to which access has not been requested by an updated version of an application 140, this behavior may be repeated in each instance the new version 140 attempts to access a data set 115 for the first time.) Hence, these three examples provide an illustration of how different embodiments provide data conversion on demand. It should be appreciated, based on these examples and the disclosure herein, that a variety of other arrangements are possible as well. With respect to FIGS. 2A and 2C, it should also be appreciated that an idempotent application might also be configured to directly access the data sets 115 in the existing table without needing reference to any data in the new table 205.

Figure 3:
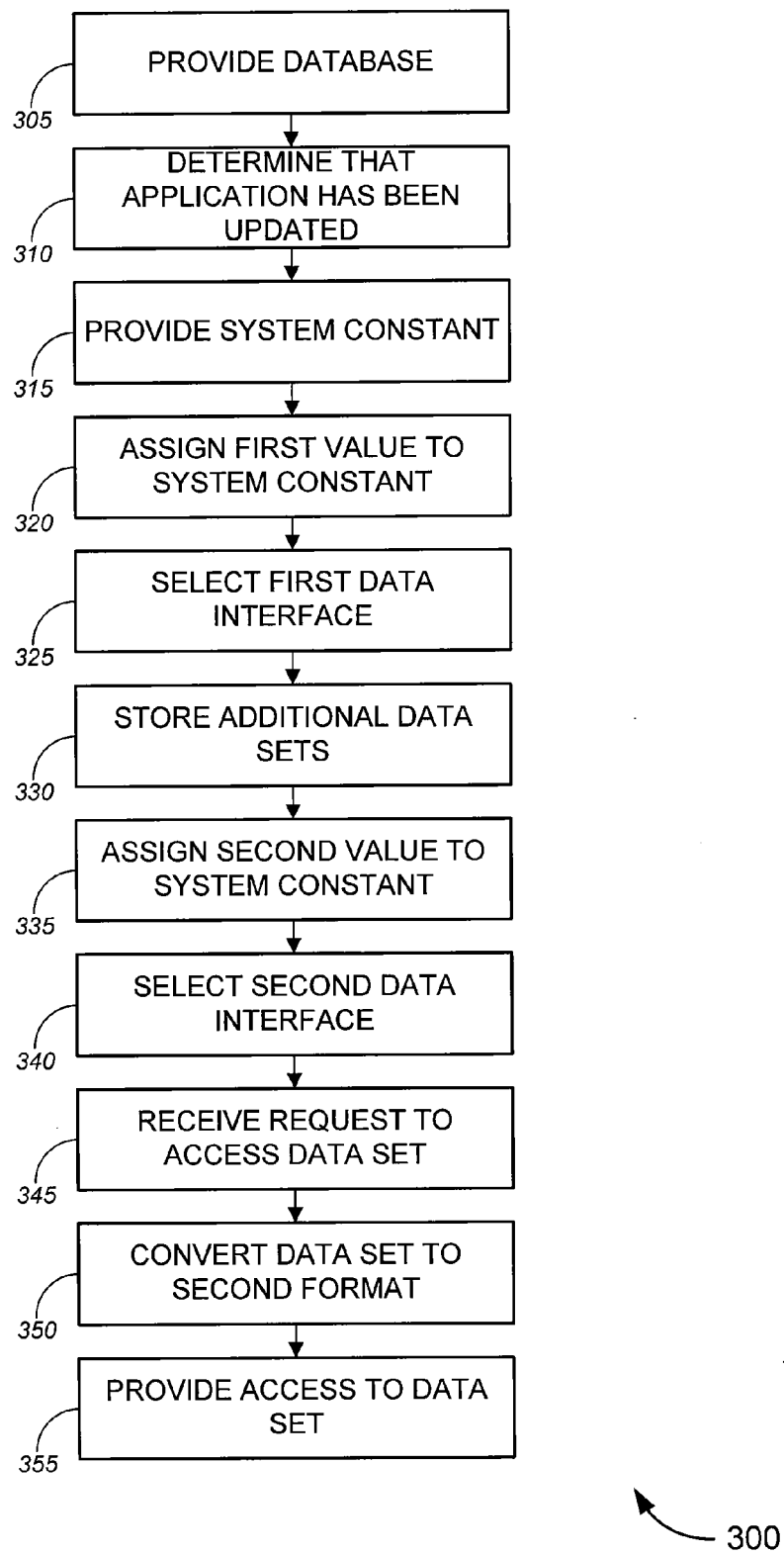
FIG. 3 is a process flow diagram illustrating a method of updating a database, in accordance with various embodiments of the invention.
Figure 4:
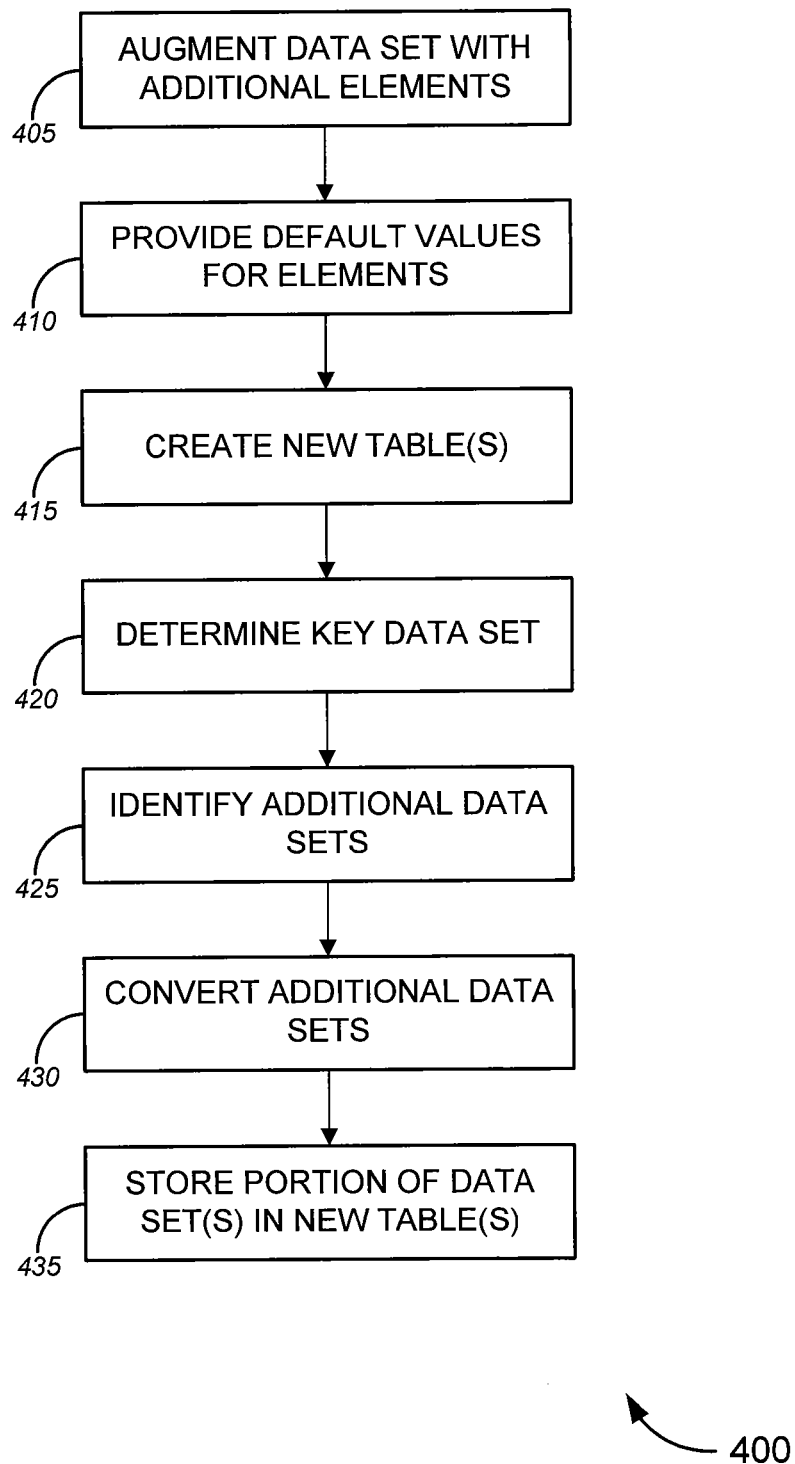
FIG. 4 is a process flow diagram illustrating a method of converting a data set, in accordance with various embodiments of the invention.

FIG. 3 illustrates a method 300 of updating a database, in accordance with one set of embodiments, and FIG. 4 illustrates a method 400 of converting a data set, in accordance with another set of embodiments. (In some cases, as described in further detail below, the method 300 might include one or more procedures of the method 400 of converting a data set. For descriptive purposes, some aspects of the methods 300 and 400 are described with respect to the system and database depicted by FIGS. 1A-1B and 2A-2C. It should be appreciated, however, that the methods 300 and 400 are not limited to any particular system architecture or database structure.

The method 300 comprises providing a database (block 305). In an aspect, providing a database comprises installing, maintaining and/or providing access to a database (which might reside on a database server, as described in further detail below). In some cases, the database is similar to the database 105 described above, and the database might be used to store data for an application (and. in particular embodiments, an enterprise application). As noted above, a database might comprise one or more tables, and each table might comprise one or more data sets (e.g., records), each of which might comprise one or more data elements (e.g., fields). In an aspect, the database, which is used by an application, stores data in a format required by that application, as described in detail above.

The method 300 further comprises determining that an application that uses the database has been updated (block 310). A variety of procedures can be used to determine that an application has been updated. In some cases, for example, an administrator can provide input to indicate that the application has been updated. In other cases, the update procedure for the application might provide information (e.g., to the RDBMS) that can allow for a determination that the application has been updated. In yet other cases, when the application attempts to access the database, it might provide information that indicates it has been updated.

In an aspect, determining that the application has been updated might comprise actually providing for the application to be updated. In some cases, providing for an application to be updated comprises updating the application itself (such as via an automatic and/or human-initiated process). In other cases, providing for an application to be updated might comprise providing facilities for the application to be updated (e.g., providing via an operating system a utility and/or interface to allow an administrator to update the application) and/or merely executing code (e.g., a patch, installation and/or upgrade program, etc.) that updates the application. As noted above, there are a variety of ways in which an application can be updated, and in various embodiments of the invention, providing for an application to be updated can comprise updating (and/or facilitating the update of) an application in any of these ways. Also as noted above, in accordance with one set of embodiments, the application can be considered to have a first (e.g., pre-update version) and a second (e.g., updated version), each of which might require some or all of the data in the database to be in a different type of format.

As noted above, in some cases, a system constant (or other value) may be provided (block 315) to allow an administrator to indicate whether the application should operate in a first (pre-update) version or a second (updated) version. In an aspect, the update facility (e.g., patch, installation/upgrade program, etc.) for the application might provide the system constant (e.g., by defining it at the time of upgrade, etc.). The system constant may be stored as an environment variable or constant, in a configuration file, etc. In some cases, the system constant may (but need not) be evaluated to determine that the application has been updated.

In this disclosure, an application is described as "operating in" a particular version when that particular version of the application is executing. Merely by way of example, there may be two different code bases for an application, with only one of the code bases being enabled at a given time, as controlled by the use of the system constant. Depending on the value assigned to the system constant, either a first code base (the pre-update version of the application) or the second code base (the updated version of the application) is enabled for use, such that when the application is started, the enabled code base is used. In an aspect, there are provided different data interfaces between the application and the database, depending on the version of the application that is enabled and the data format requirements of that application. (These data interfaces can be provided by the RDBMS, the application itself, and/or both, and can be used to provide the application with access to the data in the RDBMS. In some cases, the data interfaces are used to mediate between the application and the data structure of the database, as illustrated by FIGS. 2A-2C above, for example.)

In an aspect, the method 300 may further comprise providing for the system constant to be assigned a value to indicate that the application should continue to operate in its pre-update version, even though the code of the application has been updated (block 320). Providing for the system constant to be assigned a value might comprise assigning the value via an automated process and/or might comprise allowing an administrator (e.g., via an interface, configuration file, etc.) to assign the value. In some cases, the system constant might be assigned a value at the time it is provided and/or defined.

In some embodiments, a data interface is selected (block 325) based on the value assigned to the system constant. As noted above, a data interface may be used to provide access to the data in the database. Accordingly, the selected data interface might support accessing the data in the first format, since the value assigned to the system constant indicates that the application will continue to operate in the first version. Hence, if desired, additional data (e.g., one or more additional data sets) may be stored in the database (e.g., by the application) while the application is operating in the first version (block 330). This data may be stored in the first format, and/or access to the database (to store the data) might be provided by a first data interface.

When it is decided that the upgraded application should be enabled, the method may comprise providing for the system constant to be assigned a second value (block 335) (e.g., in similar fashion to assigning the first value, described above) indicating that the application should begin operating in its updated version. Accordingly, a different data interface might be selected (block 340) to provide access to the data in the format required by the updated version of the application.

At block 345, the database (or more specifically, in some cases, the data interface and/or the RDBMS managing the database) receives a request from the application (now operating in the updated version) to access a data set. In response to the request, the data set is converted to a second format (block 350) (e.g., by the RDBMS and/or the application). Converting the data set might comprise one or more procedures described in detail below with respect to the method 400 of FIG. 4. Henceforth, the application is provided access to the converted data set when operating in the updated version (block 355), e.g., via the second data interface.

FIG. 4 illustrates a method 400 of converting a data set in accordance with one set of embodiments. In a particular aspect, as noted above, the method 400 is performed on a data set when access to that data set is requested by an updated application. In particular, the method 400 may be used to convert data as part of the method 300 described with respect to FIG. 3, although other methods or procedures alternatively and/or additionally might be used to convert such data. Similarly, the method 400 (and/or procedures thereof) can be used to convert data in scenarios other those described with respect to FIG. 3.

As noted above, in some cases, an updated application will require the addition of new data elements to the data structure of a database. Hence, in some cases, the method 400 includes augmenting a data set (e.g., a data set to which an updated application has requested access) with one or more additional data elements (block 405). In some cases, default values may be provided for one or more of the new data elements (block 410). In an aspect, augmenting the data set comprises adding additional data elements to the data set; in another aspect, augmenting the data set comprises creating one or more additional data sets that are related to the data set being converted (e.g., using a header-detail relationship, an extension relationship, etc., as described above with respect to FIGS. 2A-2C. The additional data set might comprise the additional data elements and/or, in some cases, some or all of the data elements that previously were stored in the data set being augmented.

These additional data set(s) may be, but need not be, stored in a different table than the data set being augmented. Hence, if necessary, one or more new tables are created to hold additional and/or modified data required by the updated application (block 415). (This procedure need not be performed each time an updated application accesses a different data set—indeed, the creation of the new table(s) often will occur only once to accommodate an updated application, and may in fact be performed as part of the application update process, rather than in response to a request from the application to access any particular data set.)

In an aspect, the method 400 includes determining whether the data set to which the application has requested access is a key data set (block 420), for example, by analyzing any relational links between that data set and other data sets. Based on a determination that the data set is a key data set, the method might comprise identifying any additional data sets that are related to the key data set (and thus, that should be converted along with the requested data set) (block 425). Those additional data sets are converted as well (block 430). The same method 400 may be used to convert any such additional data sets, and in this sense can be considered recursive.

In some cases, the method 400 further comprises storing at least a portion of the converted data sets in one or more new tables (block 435), such as, for example, the table(s) created at block 415). In an aspect, a portion of the converted data set is stored in a new data set that resides in one of the new tables. The new data set may be linked to the original data set (e.g., by establishing a relationship between the two data sets, by referencing the second data set from the first data set, etc.). There are a variety of ways in which two data sets (e.g., records) can be linked in a relational database, and any of such procedures can be used in accordance with certain embodiments of the invention. As noted above, in some cases, only new elements added when augmenting a data set are stored in the new tables. In other cases, all of the existing data elements from the data set being converted might be moved to a new data set in a new table, and the existing data set might optionally be converted to a header that references the new data set in the new table. FIGS. 2A-2C provide a few, non-limiting examples of how at least a portion of a converted data set might be stored in one or more new tables, in accordance with certain embodiments of the invention.

Figure 5:
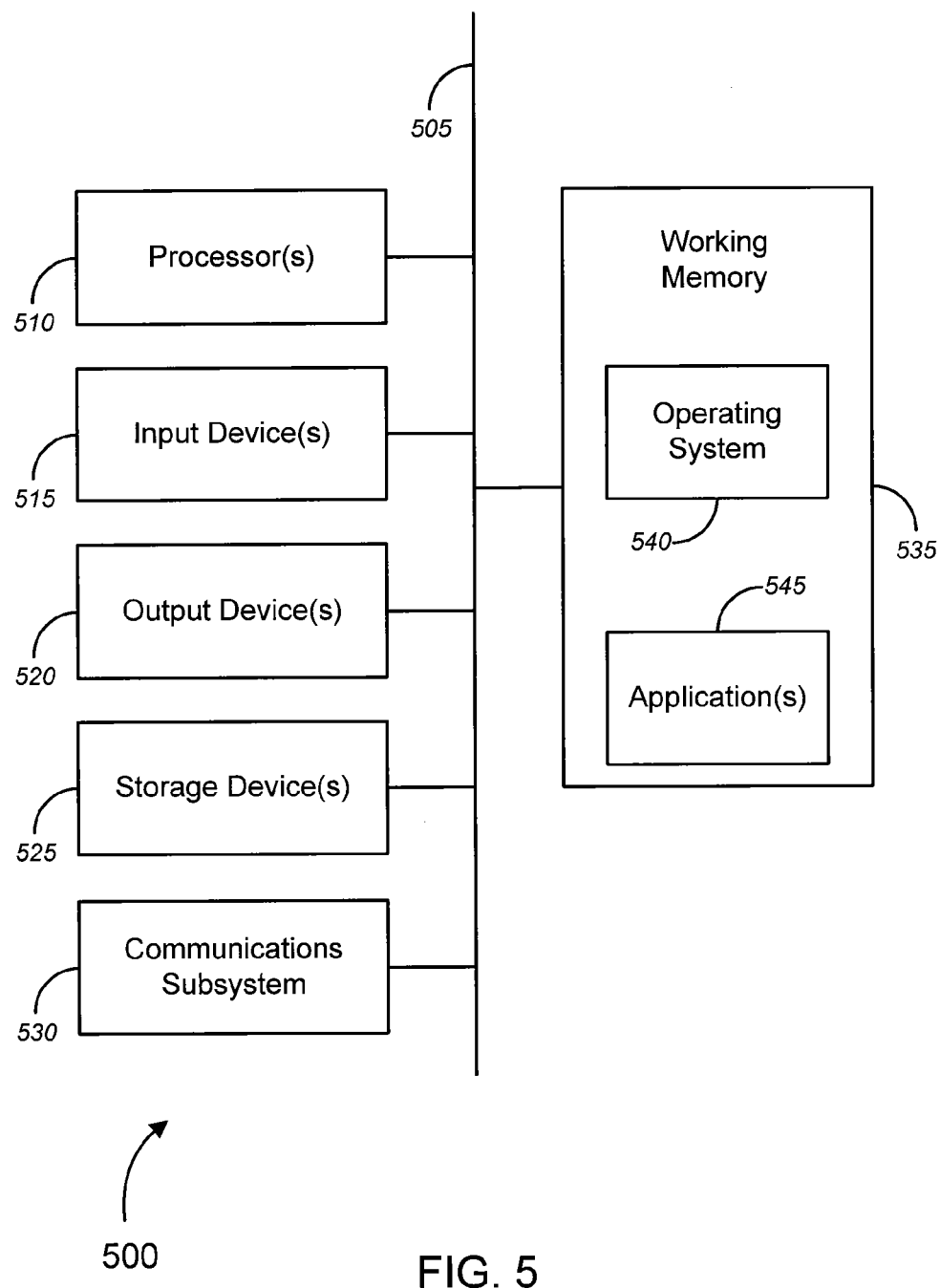
FIG. 5 is a generalized schematic diagram illustrating a computer system that can be used in accordance with various embodiments of the invention.

FIG. 5 provides a schematic illustration of one embodiment of a computer system 500 that can perform the methods of the invention, as described herein, and/or can function as a database server, application server, etc. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc.

carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
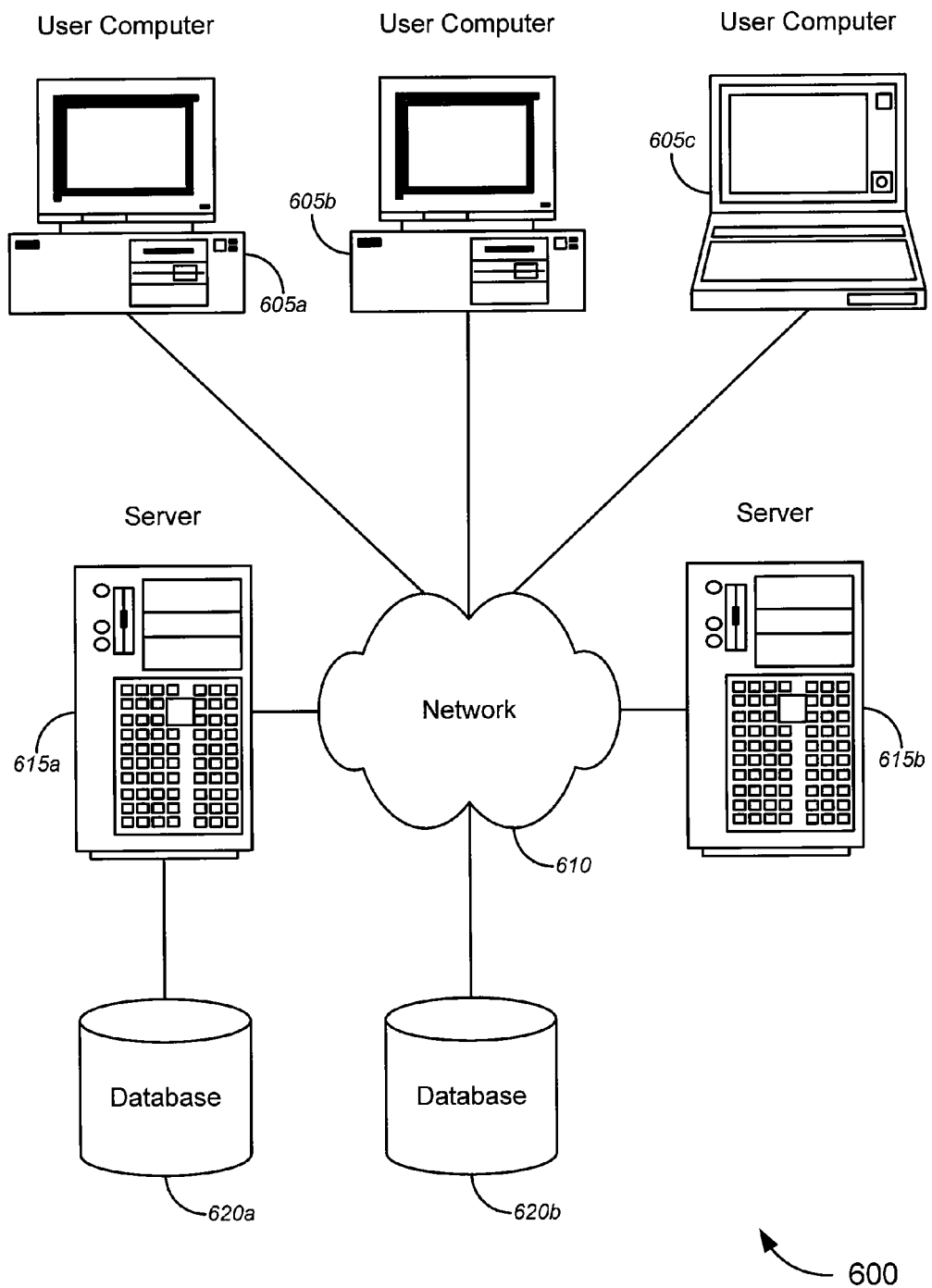
FIG. 6 is a block diagram illustrating a networked system of computers that can be used in accordance with various embodiments of the invention.

A set of embodiments comprises systems for updating a database. Some such systems comprise a network of two or more computers. For example, referring to FIG. 1A, in some embodiments, the application 130 might reside on a first computer (such as an application server), while the database 105 and/or RDBMS 107 reside on a second computer (such as a database server). Hence, FIG. 6 illustrates a schematic diagram of a system 600 that can be used in accordance with one set of embodiments.

The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems and can be used to provide access for a user to perform procedures in accordance with embodiments of the invention (e.g., assigning a value to a system constant, using and/or updating an application, etc.). These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605, such as to serve web pages created by an enterprise application.

The server computers 615, in some embodiments, might include one or more file and/or application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 605 and/or another server 615. In some embodiments, an application server can create web pages dynamically for interacting with an enterprise application. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620 (which can function as the database 105 described above, for example). The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 635 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of updating a database, the method comprising:
   determining that an application has been updated to operate in a first version and a second version, wherein the first version of the application requires data to be stored in a database in a first format, and wherein the second version of the application requires data to be stored in the database in a second format;
   providing a first data interface and a second data interface between the database and the application, wherein each interface provides for read and write access to the database;
   providing a system constant that indicates whether the application should operate in the first version or in the second version;
   providing for the system constant to be assigned a value indicating that the application should operate in the second version;
   operating the application in the second version based on the value of the system constant;
   selecting the second data interface based on a value of the system constant;
   receiving a request from the application, operating in the second version, through the second data interface, to access a first data set in a first table of the database, the first data set being stored in the first format and comprising a first set of data elements; and
   in response to receiving the request from the application through the second data interface:
      creating a second table in the database;
      storing, using at least one processor operatively coupled with a memory, a second set of data elements in the second table in the database based on the received request, the first and second sets of data elements being necessary for the operating the application in the second version;
      creating a header table in the database, the header table comprising a third data set;
      storing a first reference in the third data set to the first set of data elements;
      storing a second reference in the third data set to the second set of data elements; and
      providing, through the second data interface, the application with data in the second format by:
         (i) dereferencing the first reference in the third data set of the header table to retrieve the first set of data elements from the first table;
         (ii) dereferencing the second reference in the third data set of the header table to retrieve the second set of data elements in the second table; and
         (iii) providing the application with both the first set of data elements in the first table and the second set of data elements in the second table.

2. The method of claim 1, wherein determining that the application has been updated comprises providing for the application to be updated.

3. The method of claim 2, wherein providing for the application to be updated comprises for the application to be patched.

4. The method of claim 1, wherein determining that the application has been updated comprises providing for the application to be upgraded to a new release level.

5. The method of claim 1, wherein the first data set, in the first format, comprises a first set of one or more data elements.

6. The method of claim 1, further comprising augmenting the first data set with a second set of one or more data elements and providing default values for one or more of the data elements in the second set.

7. The method of claim 1, wherein the plurality of data sets comprises a second data set, and wherein the second data set remains in the first format until accessed by the application.

8. The method of claim 1, further comprising:
   determining that the first data set is a key data set;
   based on a determination that the first data set is a key data set, identifying one or more additional data sets that are related to the first data set; and
   converting the one or more additional data sets to the second format, in response to receiving the request from the application.

9. The method of claim 1, wherein the first data set comprises a record in the first table.

10. The method of claim 9, further comprising creating a record in a second table in the database.

11. The method of claim 10, further comprising linking the record in the second table with the record in the first table.

12. The method of claim 1, further comprising:
   moving some of the first set of data elements in the first table to the second table.

13. The method of claim 1, wherein the storing of the second set of data elements is done on-demand, such that a third set of data elements in the first table of the database is not converted to the second format, wherein:
- the third set of data elements will be used by the application when operating in the second version; and
- the application has not yet requested access to the third set of data elements.

14. A non-transitory computer readable storage medium having encoded thereon a computer program comprising a set of instructions for programming a computer system to perform a set of operations, the computer program comprising:
- instructions to determine that an application has been updated to operate in a first version and a second version, wherein the first version of the application requires data to be stored in a database in a first format, and wherein the second version of the application requires data to be stored in the database in a second format;
- instructions to provide a first data interface and a second data interface between the database and the application, wherein each interface provides for read and write access to the database;
- instructions to provide a system constant that indicates whether the application should operate in the first version or in the second version;
- instructions to provide for the system constant to be assigned a value indicating that the application should operate in the second version;
- instructions to operate the application in the second version based on the value of the system constant;
- instructions to select the second data interface based on a value of the system constant;
- instructions to receive a request from the application, operating in the second version, through the second data interface, to access a first data set in a first table of the database, the first data set being stored in the first format and comprising a first set of data elements; and
- in response to receiving the request from the application through the second data interface:
  - instructions to create a second table in the database;
  - instructions to store a second set of data elements in a second table in the database based on the received request, the first and second sets of data elements being necessary for operating the application in the second version;
  - instructions to create a header table in the database, the header table comprising a third data set;
  - instructions to store a first reference in the third data set to the first set of data elements;
  - instructions to store a second reference in the third data set to the second set of data elements; and
  - instructions to provide, through the second data interface, the application with data in the second format by:
    - (i) dereferencing the first reference in the third data set of the header table to retrieve the first set of data elements from the first table;
    - (ii) dereferencing the second reference in the third data set of the header table to retrieve the second set of data elements in the second table; and
    - (iii) providing the application with both the first set of data elements in the first table and the second set of data elements in the second table.

15. A computer system, comprising:
- a database for storing data for an application, the database comprising a first table, the first table being configured to store a plurality of data sets;
- one or more processors in communication with the database;
- a non-transitory computer readable storage medium having encoded thereon a computer program comprising a set of instructions for programming the one or more processors to perform a set of operations, the computer program comprising:
  - instructions to determine that an application has been updated to operate in a first version and a second version, wherein the first version of the application requires data to be stored in a database in a first format, and wherein the second version of the application requires data to be stored in the database in a second format;
  - instructions to provide a first data interface and a second data interface between the database and the application, wherein each interface provides for read and write access to the database;
  - instructions to provide a system constant that indicates whether the application should operate in the first version or in the second version;
  - instructions to provide for the system constant to be assigned a value indicating that the application should operate in the second version;
  - instructions to operate the application in the second version based on the value of the system constant;
  - instructions to select the second data interface based on a value of the system constant;
  - instructions to receive a request from the application, operating in the second version, through the second data interface, to access a first data set in a first table of the database, the first data set being stored in the first format and comprising a first set of data elements; and
  - in response to receiving the request from the application through the second data interface:
    - instructions to create a second table in the database;
    - instructions to store a second set of data elements in a second table in the database based on the received request, the first and second sets of data elements being necessary for operating the application in the second version;
    - instructions to create a header table in the database, the header table comprising a third data set;
    - instructions to store a first reference in the third data set to the first set of data elements;
    - instructions to store a second reference in the third data set to the second set of data elements; and
    - instructions to provide, through the second data interface, the application with data in the second format by:
      - (i) dereferencing the first reference in the third data set of the header table to retrieve the first set of data elements from the first table;
      - (ii) dereferencing the second reference in the third data set of the header table to retrieve the second set of data elements in the second table; and
      - (iii) providing the application with both the first set of data elements in the first table and the second set of data elements in the second table.

* * * * *

UNITED STATES PATENT AND TRADEMARK OFFICE
CERTIFICATE OF CORRECTION

Page 1 of 1

PATENT NO. : 8,583,613 B2
APPLICATION NO. : 11/842618
DATED : November 12, 2013
INVENTOR(S) : Liu et al.

It is certified that error appears in the above-identified patent and that said Letters Patent is hereby corrected as shown below:

In the Specification

In column 6, line 12, delete "10a)" and insert -- 110a) --, therefor.

In column 8, line 2, delete "might" and insert -- might be --, therefor.

In column 13, line 52, delete "and or" and insert -- and/or --, therefor.

In the Claims

In column 18, line 13, in Claim 1, delete "the operating" and insert -- operating --, therefor.

Signed and Sealed this
Third Day of June, 2014

Michelle K. Lee
*Deputy Director of the United States Patent and Trademark Office*